United States Patent
Brezina et al.

(10) Patent No.: US 7,093,987 B2
(45) Date of Patent: Aug. 22, 2006

(54) MOUNTING A LENS ARRAY IN A FIBER OPTIC TRANSCEIVER

(76) Inventors: Johnny R. Brezina, 7506 Creekbluff Dr., Austin, TX (US) 78750;
Christopher M. Gabel, 518 26th St., NW., Rochester, MN (US) 55901;
Brian M. Kerrigan, 6203 Amberly Pl., Austin, TX (US) 78759; Roger T. Lindquist, 402 9th St., NW., Dodge Center, MN (US) 55927; Gerald D. Malagrino, Jr., 4430 London La., NW., Rochester, MN (US) 55901; James R. Moon, 7350 River Heights Ct., NW., Oronoco, MN (US) 55960

(*) Notice: Subject to any disclaimer, the term of this patent is extended or adjusted under 35 U.S.C. 154(b) by 638 days.

(21) Appl. No.: 10/006,837

(22) Filed: Nov. 5, 2001

(65) Prior Publication Data
US 2003/0103739 A1 Jun. 5, 2003

Related U.S. Application Data

(63) Continuation-in-part of application No. 09/956,771, filed on Sep. 20, 2001.

(51) Int. Cl.
*G02B 6/36* (2006.01)

(52) U.S. Cl. .............. 385/93; 389/92; 389/33; 389/39; 389/51; 389/52; 389/53; 389/89

(58) Field of Classification Search .............. 385/31, 385/33, 35, 39, 51, 52, 61, 63, 88, 89, 91–93, 385/136–137
See application file for complete search history.

(56) References Cited

U.S. PATENT DOCUMENTS 6,493,489 B1 * 12/2002 Mertz et al. ................. 385/52

* cited by examiner

*Primary Examiner*—Drew Dunn
*Assistant Examiner*—Fayez Assaf

(57) ABSTRACT

The present invention provides a fiber optic lens assembly and method of mounting a lens array in the same. The fiber optic lens assembly includes a housing including a lens mounting aperture formed therein. The housing includes at least one feature adjacent the lens mounting aperture. A lens array is positioned within the lens mounting aperture and adjacent the feature. At least one biasing member is positioned adjacent the lens array. The biasing member forces the lens array against the feature. The method includes positioning the lens array adjacent at least one feature formed in a lens mounting aperture of a housing. At least one biasing member is inserted in the lens mounting aperture adjacent the lens array. A cornering force is applied against the lens array with the biasing member.

19 Claims, 5 Drawing Sheets

MOUNTING A LENS ARRAY IN A FIBER OPTIC TRANSCEIVER

RELATED APPLICATIONS

This application claims priority as a continuation-in-part to co-pending U.S. patent application Ser. No. 09/956,771 filed on Sep. 20, 2001 entitled "Fiber Optic Transceiver, Connector, And Method of Dissipating Heat" by Johnny R. Brezina, et at., the entire disclosure of which is incorporated by reference, herein.

This application also relates to the following applications, filed concurrently herewith:

"Optical Alignment In A Fiber Optic Transceiver", by Johnny R. Brezina, et al. Ser. No. 10/007,027;

"External EMI Shield For Multiple Array Optoelectronic Devices", by Johnny R. Brezina, et al. Ser. No. 10/006,644;

"Packaging Architecture For A Multiple Array Transceiver Using A Continuous Flexible Circuit", by Johnny R. Brezina, et al Ser. No. 10/007,026;

"Flexible Cable Stiffener for An Optical Transceiver", by Johnny R. Brezina, et al. Ser. No. 10/007,028;

"Enhanced Folded Flexible Cable Packaging for Use in Optical Transceivers, by Johnny R. Brezina, et al. Ser. No. 10/006,836;

"Apparatus and Method for Controlling an Optical Transceiver", by Johnny R. Brezina, et al. Ser. No. 10/007,024;

"Internal EMI Shield for Multiple Array Optoelectronic Devices", by Johnny R. Brezina, et al. Ser. No. 10/006,834;

"Multiple Array Optoelectronic Connector with Integrated Latch", by Johnny R. Brezina, et al. Ser. No. 10/007,023;

"Packaging Architecture for a Multiple Array Transceiver Using a Flexible Cable", by Johnny R. Brezina, et al. Ser. No. 10/006,835;

"Packaging Architecture for a Multiple Array Transceiver Using a Flexible Cable and Stiffener for Customer Attachment", by Johnny R. Brezina, et al. Ser. No. 10/006,838;

"Packaging Architecture for a Multiple Array Transceiver Using a Winged Flexible Cable for Optimal Wiring", by Johnny R. Brezina, et al. Ser. No. 10/006,839; and "Horizontal Carrier Assembly for Multiple Array Optoelectronic Devices", by Johnny R. Brezina, et al. Ser. No. 10/007,215.

TECHNICAL FIELD OF THE INVENTION

The present invention relates generally to computer systems and in particular to mounting and retaining a lens array in a fiber optic transceiver.

BACKGROUND OF THE INVENTION

Single and multiple optical lens array fiber optic transceiver devices require precise optical component to fiber alignment for optimal function. The devices may include optical laser and/or photodetector components each coupled to a distinct optical fiber component through an optical lens component. The alignment process generally involves adjusting a laser light beam path from an optical fiber or laser to a receiving photodetector or optical fiber element, respectively. The typical optical alignment tolerance for a 62.5 micron diameter fiber using a lens array is on the order of only plus or minus 5 microns. Thus, alignment considerations are essential in the design and assembly of fiber optic transceiver devices.

At least two methods are known for aligning the transceiver optical components and fiber optic cable. A first method is known as active alignment. Active alignment utilizes the laser in an active state at a sub-assembled stage of the transceiver. After the laser is turned on, the optical components are moved in a relative radial plane (normal to the optical path) while a photoreceiver output is monitored to establish maximum light throughput. Once the light throughput is optimized, the components are mechanically fixed to hold them in alignment. A second method is known as passive alignment. Passive alignment relies on holding very accurate mechanical tolerances on all elements affecting the optical path, and alignment is therefore achieved without monitoring laser output.

One consideration in the design of the fiber optic transceiver involves mounting the optical lens array within the transceiver. The design should provide precise positioning of the optical lens array thereby facilitating optical transceiver alignment. The precise alignment of the lens array is a critical element in the passive alignment of the transceiver. Another design consideration involves complexity of the optical lens array mounting. The design should provide a simple, compact assembly containing a small number of parts. Moreover, the optical lens array should be mounted with a relatively simple, cost-effective strategy ensuring easy manufacture and alignment process. Current strategies, however, may not provide a simple, inexpensive, and accurate optical lens array mounting strategy.

Therefore, it would be desirable to provide an assembly and method for mounting an optical lens array in a fiber optic transceiver that would overcome the aforementioned and other disadvantages.

SUMMARY OF THE INVENTION

One aspect of the present invention provides a fiber optic lens assembly. The transceiver assembly includes a housing including a lens mounting aperture formed therein. The housing includes at least one feature adjacent the lens mounting aperture. A lens array is positioned within the lens mounting aperture and adjacent the feature. At least one biasing member is positioned adjacent the lens array. The biasing member forces the lens array against the feature. The lens array may include a plurality of symmetrical and/or asymmetrical lenses. At least one pocket relief may be formed adjacent the lens mounting aperture for receiving an adhesive. The adhesive may be an ultraviolet curable adhesive. A plurality of alignment pins may be positioned adjacent the lens mounting aperture for aligning at least one optical element with the lens array. The optical elements may include a device carrier and a fiber optic cable. At least one relief may be formed in the alignment pin. The biasing member may include an elastomeric material. The elastomeric material may include Viton. The feature may include a housing projection. A lens aperture may be formed in the housing to establish a proper dimensional distance to a lens array focal plane.

Another aspect of the present invention provides a method of mounting a lens array in a fiber optic lens assembly. The lens array is positioned adjacent at least one feature formed in a lens mounting aperture of a housing. At least one biasing member is inserted in the lens mounting aperture adjacent the lens array. A cornering force is applied against the lens array with the biasing member. An adhesive may be added in at least one pocket relief formed in the housing and positioned adjacent the inserted lens mounting aperture. A proper dimensional distance may be established between the lens array and a lens array focal plane with a lens aperture formed in the housing. At least one optical element may be aligned with the lens array with a plurality of pins. At least one optical element may be attached to the housing using a relief formed in the alignment pin. The optical elements may include a device carrier and a fiber optic cable. The biasing member may include an elastomeric material. The elastomeric material may include Viton. The feature may include a housing projection.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTY PREFERRED EMBODIMENTS

The present invention provides a fiber optic lens assembly and method of mounting a lens array in the same. The fiber optic lens assembly includes a housing including a lens mounting aperture formed therein. The housing includes at least one feature adjacent the lens mounting aperture. A lens array is positioned within the lens mounting aperture and adjacent the feature. At least one biasing member is positioned adjacent the lens array. The biasing member forces the lens array against the feature. The method includes positioning the lens array adjacent at least one feature formed in a lens mounting aperture of a housing. At least one biasing member is inserted in the lens mounting aperture adjacent the lens array. A cornering force is applied against the lens array with the biasing member.

The present invention is shown and described by the following figures and description of a multiple array transceiver assembly. Those skilled in the art will recognize that the invention is not limited to the 2.5 gigahertz, 4-channel multiple array transceiver assembly disclosed. For example, the invention may be adapted to a single fiber optic array as well as numerous multiple channel fiber optic arrays. In the following description, an axial direction is defined as a direction parallel to light traveling through optical components in the multiple array transceiver assembly. Furthermore, a radial direction is defined as a direction normal to the axial direction.

Figure 1:
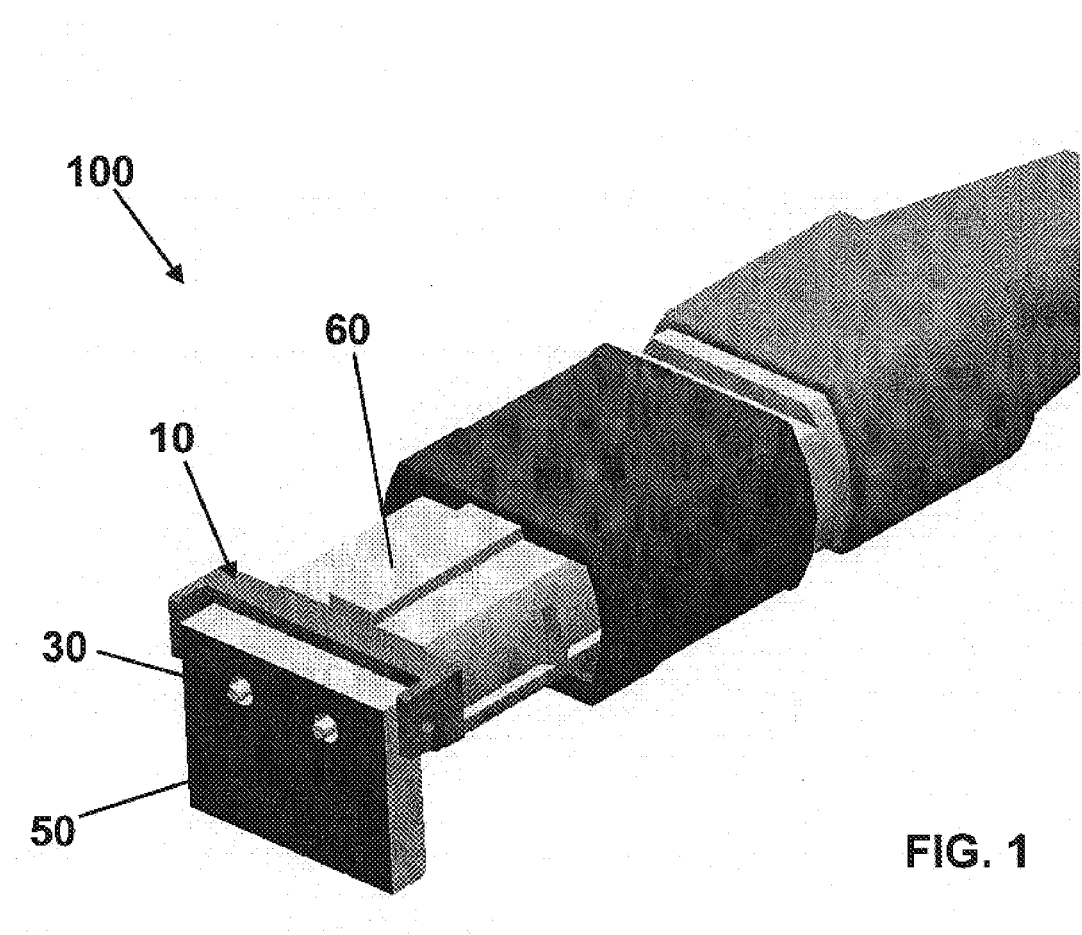
FIG. 1 is an elevated view of a fiber optic transceiver assembly made in accordance with the present invention.

FIG. 1 is an elevated view of a fiber optic transceiver assembly made in accordance with the present invention. In the illustrated and described embodiment, the fiber optic transceiver assembly is designated in the aggregate as numeral 100. The fiber optic transceiver 100 may include a device carrier 50 and a fiber optic cable 60 operably attached to a fiber optic lens assembly 10.

The device carrier 50 may include optical and electronic components disposed on a common substrate carrier. The device carrier 50 may include optical components (not shown) to convert an electrical signal to a light signal or convert a light signal to an electrical signal as known in the art. The optical components may include a laser die and a photodetector die to produce and measure light, respectively. The fiber optic cable 60 may be one of many fiber optic cables known in the art such as a standard MTP-type fiber optic cable. The fiber optic cable 60 may include at least one fiber (not shown) terminating at a fiber end for sending and receiving light. Furthermore, the present invention is compatible with both stepped index and graded index fiber optic cable types.

The fiber optic lens assembly 10 may be used to couple the light signal to or from the device carrier 50 optical components to the fiber optic cable 60. The fiber optic lens assembly 10 enables higher light transfer coupling efficiency through the ability of a lens to focus light divergence and convergence of input and output optical channel signals. To ensure optimal light transfer coupling efficiency, precise alignment of the optical components, fiber optic lens assembly, and fiber elements is required. In one embodiment, a combination of passive and active alignment strategies is used for precise optical alignment. Several of these alignment strategies will be elucidated by the following figures and description of the fiber optic lens assembly.

Figure 2A:
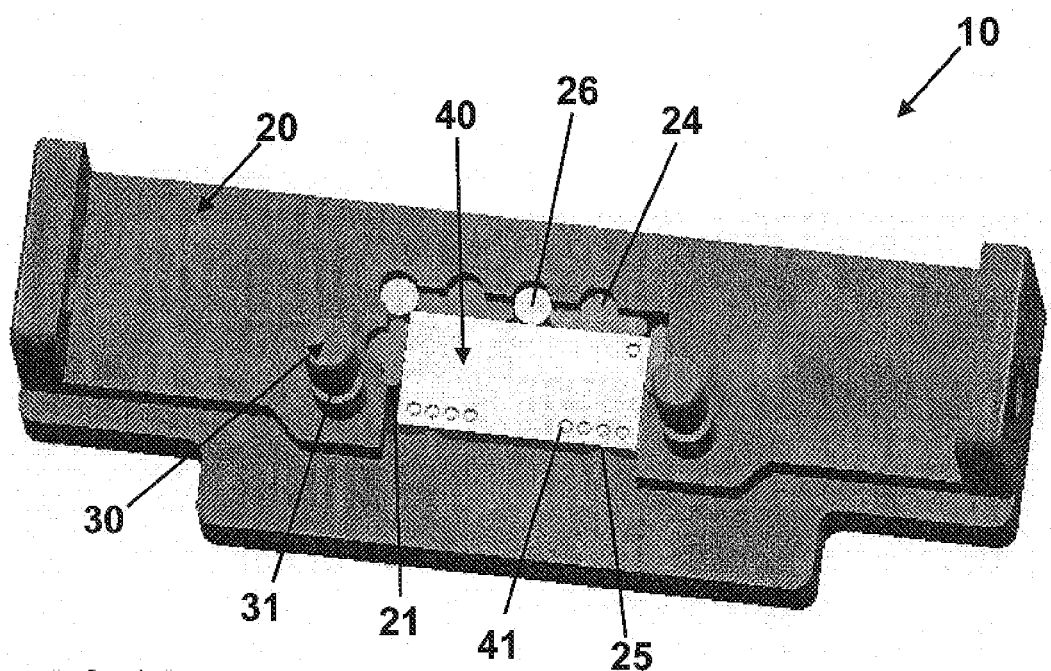
FIGS. 2A & 2B are alternative elevated views of a fiber optic lens assembly made in accordance with the present invention.
Figure 2B:
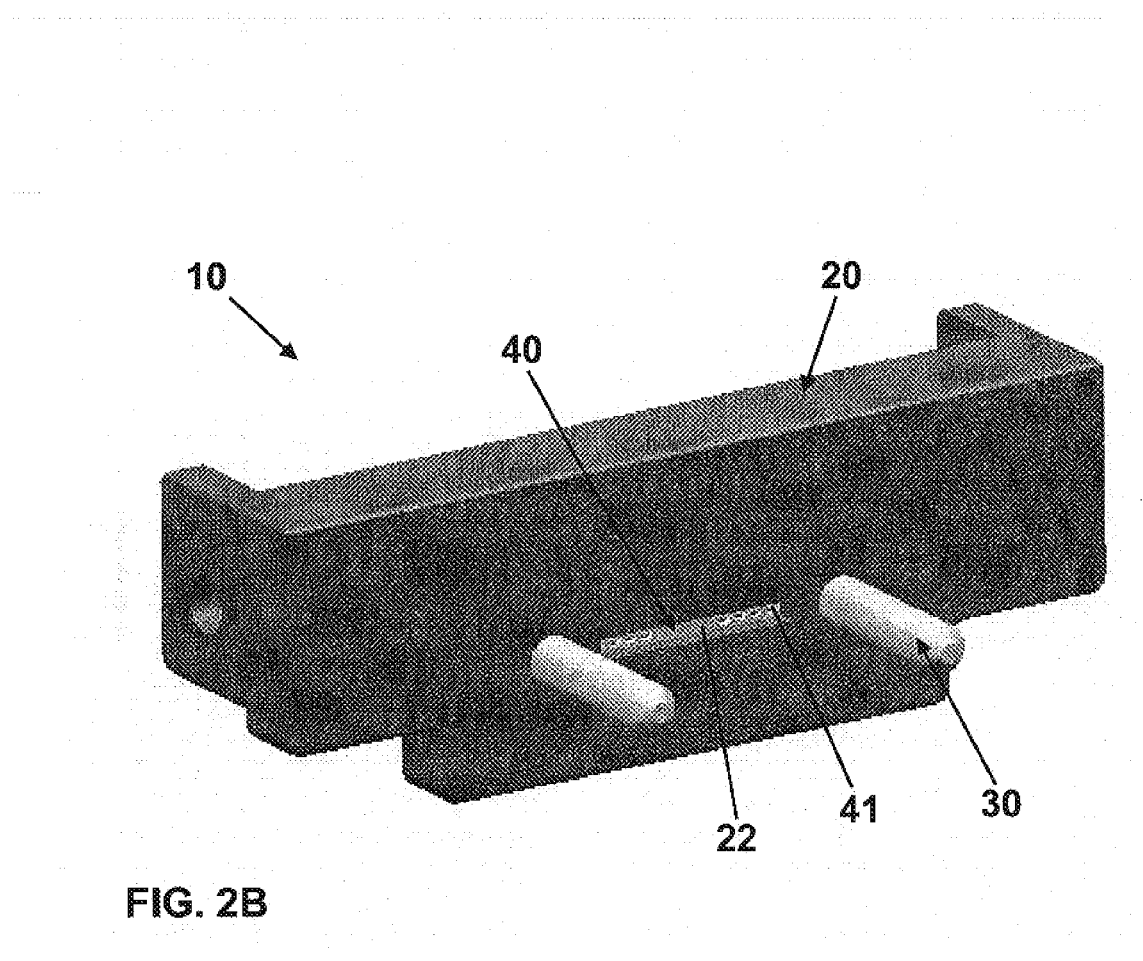

FIGS. 2A & 2B, in which like elements have like reference numbers, are alternative elevated views of a fiber optic lens assembly 10 made in accordance with the present invention. FIG. 2A shows the fiber optic lens assembly 10 from the direction of where the device carrier 50 may be attached. FIG. 2B shows the fiber optic lens assembly 10 from the direction of where the fiber optic cable 60 may be attached.

The fiber optic lens assembly 10 may include a molded housing 20 having a lens mounting aperture 21, lens aperture 22, and alignment pins 30. An optical lens array 40 may be retained within the lens mounting aperture 21 using a combination of an adhesive 24, retaining features, and biasing members 26. In one embodiment, the adhesive 24 may include ultraviolet light curable adhesive, or similar attachment means, and the retaining features may include a plurality of housing projections 25. The housing projections 25 and biasing members 26 may provide optical lens array 40 to pin 30 alignment accuracy of approximately plus or minus 16 microns in the radial direction. In addition, the housing projections 25 and biasing members 26 may provide means for passively aligning the optical lens array 40 in the fiber optic lens assembly 10. The relative thickness of the molded housing 20 and lens aperture 22 allows proper dimensional distance to the respective image and focal planes of the optical lens array 40.

In one embodiment, the molded housing 20 may be manufactured from any number of sufficiently rigid materials such as a polymeric or plastic material. The optical lens array 40 may be manufactured from a fused silica, polymer, or other suitable optical material that is etched to create lens prescriptions in an array pattern, including symmetrical and asymmetrical lens designs. The optical lens array 40 may provide a plurality of lenses 41, one lens for each input and output optical channel in the multiple array transceiver assembly. In one embodiment, the optical lens array 40 may contain eight lenses. The plurality of lenses 41 may be aligned with the lens aperture 22. The alignment pins 30 may each include a relief 31 to provide a volume for adding a curable adhesive during transceiver assembly alignment.

The biasing member 26 may be manufactured from an elastomeric material such as Viton, which will remain elastomeric through typical epoxy cure and solder reflow temperature profiles. In addition, the biasing member 26 may be designed in a variety of geometric shapes including, but not limited to, cylindrical, polygonal prism, and spherical shapes.

Figure 3A:
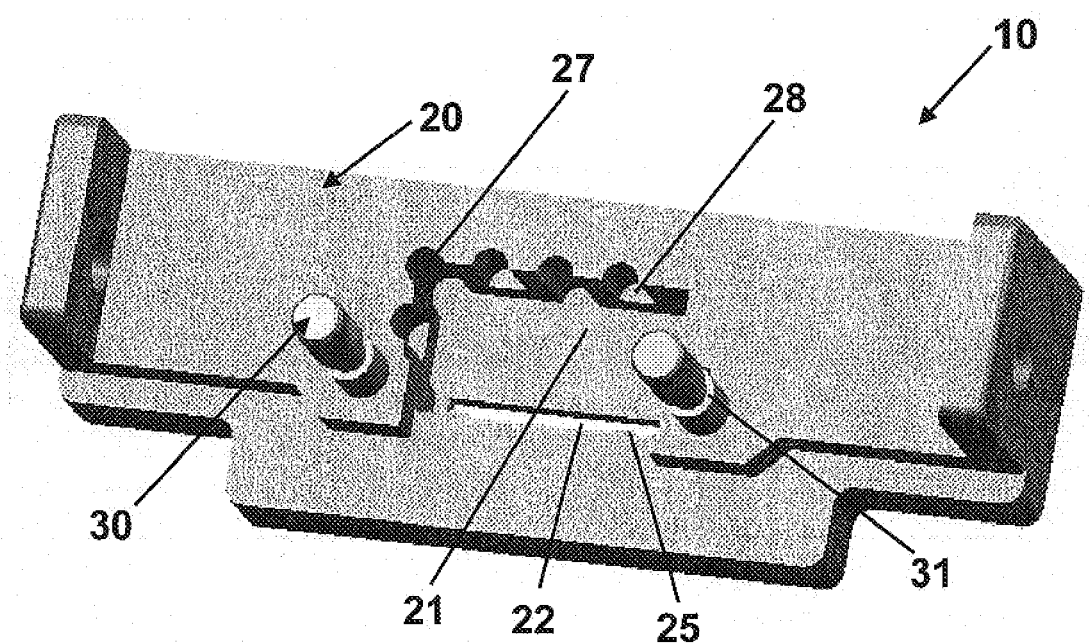
FIGS. 3A & 3B are alternative elevated views of a fiber optic lens assembly shown without a lens array and made in accordance with the present invention.
Figure 3B:
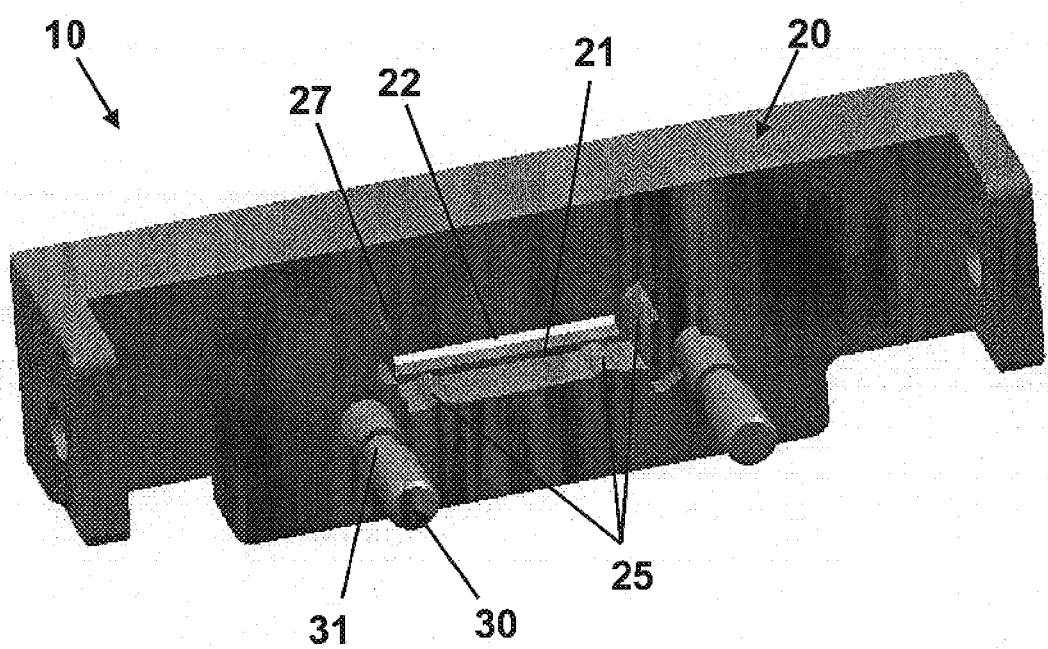

FIGS. 3A & 3B, in which like elements have like reference numbers, are alternative elevated views of a fiber optic lens assembly 10 shown without an optical lens array and made in accordance with the present invention. FIG. 3A provides an unobstructed view of the lens mounting aperture 21 prior to placement of the optical lens array. FIG. 3B provides a clear view of the housing projections 25 used for cornering the optical lens array in the molded housing 20.

At least one biasing relief 27 may be formed adjacent the lens mounting aperture 21 for receiving the biasing member. The biasing relief 27 may be generally shaped to correspond to the shape of the biasing member. In one embodiment, the biasing relief 27 may have a round shape to receive a cylindrical biasing member. At least one pocket relief 28 may be formed adjacent the lens mounting aperture 21 for receiving the adhesive. The pocket relief 28 may be generally shaped to allow the adhesive to flow along a perimeter of the optical lens array. In one embodiment, the pocket relief 28 may be shaped to allow the adhesive to be needle injected and to subsequently flow along the optical lens array perimeter.

Referring now to FIGS. 1, 2A, 2B, 3A, and 3B, assembly of the fiber optic lens assembly 10 may include positioning the optical lens array 40 within the lens mounting aperture 21. The housing projections 25 may corner the optical lens array 40 in the lens mounting aperture 21 providing a gross fit. At least one biasing member 26 may then be inserted in the biasing relief 27. The biasing member 26 may provide a cornering force on the optical lens array 40 permitting the passive alignment of the fiber optic lens array 10. In one embodiment, the optical lens array 40 may then be permanently fixed in the molded housing by adding the adhesive 24 into at least one pocket relief 28. Those skilled in the art will appreciate that the number, shape, and arrangement of the housing projections, biasing members and reliefs, and pocket reliefs may be varied while providing accurate passive alignment of the fiber optic lens assembly. In the described embodiment, the housing projections, biasing members and reliefs, and pocket reliefs may provide a simple, inexpensive, and accurate optical lens array mounting strategy.

After passive alignment of the fiber optic lens assembly 10, active optical alignment may include, in one embodiment, mounting the device carrier 50 and the fiber optic cable 60 on the alignment pins 30. The alignment pins 30 may provide means for attaching and grossly aligning the fiber optic lens assembly 10 to the fiber optic cable 60 and device carrier 50. The alignment pins 30 may also provide means for fixing movement of the fiber optic lens assembly 10 with respect to the fiber optic cable 60 and device carrier 50 in the axial direction. The optical alignment process may further include fixing movement of the fiber optic lens assembly 10 to the fiber optic cable 60 in the radial direction. In one embodiment, fiber optic cable retention clips (not shown) standard in the art may fix radial movement of the fiber optic cable 60. At this point, free movement is restricted between the fiber optic cable 60 and fiber optic lens assembly 10 whereas free radial play is allowed between the fiber optic cable/lens assembly and the device carrier 50.

The alignment process may further include powering on a device carrier 50 laser to send light through the fiber optic lens assembly 10 and on to the fiber optic cable 60. The fiber optic lens assembly 10 and attached fiber optic cable 60 may be moved in the radial direction with respect to device carrier 50. An alignment tool (not shown) standard in the art may be used to move the components relative to one another during the alignment process. The alignment tool may move the attached fiber optic lens assembly 10/fiber optic cable 60 in the radial direction following a scanning pattern. As the attached fiber optic lens assembly 10/fiber optic cable 60 are moved, the laser light transmitted from the device carrier 50 may be monitored through the fiber optic cable 60 by methods standard in the art.

Once the light throughput is optimized, the radial movement of the fiber optic lens assembly 10/fiber optic cable 60 relative to the device carrier 50 may be fixed with an adhesive. In addition, the alignment pin reliefs 31 may provide means for adding the adhesive to further fix axial movement between the fiber optic lens assembly 10 and device carrier 50. The laser may then be powered off and the alignment tool removed to allow operation of the transceiver assembly. At this point, optical alignment of the multiple array transceiver assembly is complete. The utilization of both the aforementioned passive and active alignment strategies may allow for the precise alignment of the optical elements while reducing time and expense of standard alignment procedures. Furthermore, the described process may yield an optical alignment well within the tolerance of plus or minus 5 microns.

It is important to note that the figures and description illustrate specific applications and embodiments of the present invention, and are not intended to limit the scope of the present disclosure or claims to that which is presented therein. While the figures and description present optical alignment of a 2.5 gigahertz, 4-channel transmit and 4-channel receive multiple array transceiver, the present invention is not limited to that format, and is therefore applicable to other array formats including dedicated transceiver modules, dedicated receiver modules, and modules with different numbers of channels. The described sequence of mounting the lens array and active alignment need not follow the prescribed sequence in order to effectively achieve accurate optical alignment; the fiber optic lens assembly/device carrier may be first fixed together following active alignment with the fiber optic cable. In addition, the size, shape, number, and arrangement of the housing projections, biasing members/reliefs, and pocket reliefs may be modified while providing effective mounting of the optical lens array. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A fiber optic lens assembly comprising:
   a housing including a lens mounting aperture formed therein, the housing including at least one feature adjacent the lens mounting aperture;
   a lens array positioned within the lens mounting aperture and adjacent the feature; and
   at least one biasing member positioned adjacent the lens array, wherein the biasing member forces the lens array against the feature; wherein at least one feature includes a housing projection.

2. The assembly of claim 1 wherein the lens array comprises a plurality of lenses each selected from a group consisting of a symmetrical lens and an asymmetrical lens.

3. The assembly of claim 1 further comprising at least one pocket relief formed adjacent the lens mounting aperture for receiving an adhesive.

4. The assembly of claim 3 wherein the adhesive is an ultraviolet curable adhesive.

5. The assembly of claim 1 further comprising a plurality of alignment pins positioned adjacent the lens mounting aperture for aligning at least one optical element with the lens array.

6. The assembly of claim 5 wherein the optical elements comprise a device carrier and a fiber optic cable.

7. The assembly of claim 5 further comprising at least one relief formed in the alignment pin.

8. The assembly of claim 1 wherein the biasing member comprises an elastomeric material.

9. The assembly of claim 1 wherein the elastomeric material comprises Viton.

10. The assembly of claim 1 further comprising a lens aperture formed in the housing to establish a proper dimensional distance to a lens array focal plane.

11. A method of mounting a lens array in a fiber optic lens assembly comprising:
    positioning the lens array adjacent at least one feature formed in a lens mounting aperture of a housing, wherein at least one feature includes a housing projection;
    inserting at least one biasing member in the lens mounting aperture adjacent the lens array; and
    applying a cornering force against the lens array with the biasing member.

12. The method of claim 11, further comprising adding an adhesive in at least one pocket relief formed in the housing and positioned adjacent the inserted lens mounting aperture.

13. The method of claim 11, further comprising establishing a proper dimensional distance between the lens array and a lens array focal plane with a lens aperture formed in the housing.

14. The method of claim 11, further comprising aligning at least one optical element with the lens array with a plurality of pins.

15. The method of claim 14 further comprising attaching at least one optical element to the housing using a relief formed in the alignment pin.

16. The methods of claim 14, wherein the optical elements comprise a device carrier and a fiber optic cable.

17. The methods of claim 15, wherein the optical elements comprise a device carrier and a fiber optic cable.

18. The method of claim 11, wherein the biasing member comprises an elastomeric material.

19. The method of claim 18, wherein the elastomeric material comprises Viton.

* * * * *